Patented Oct. 9, 1934

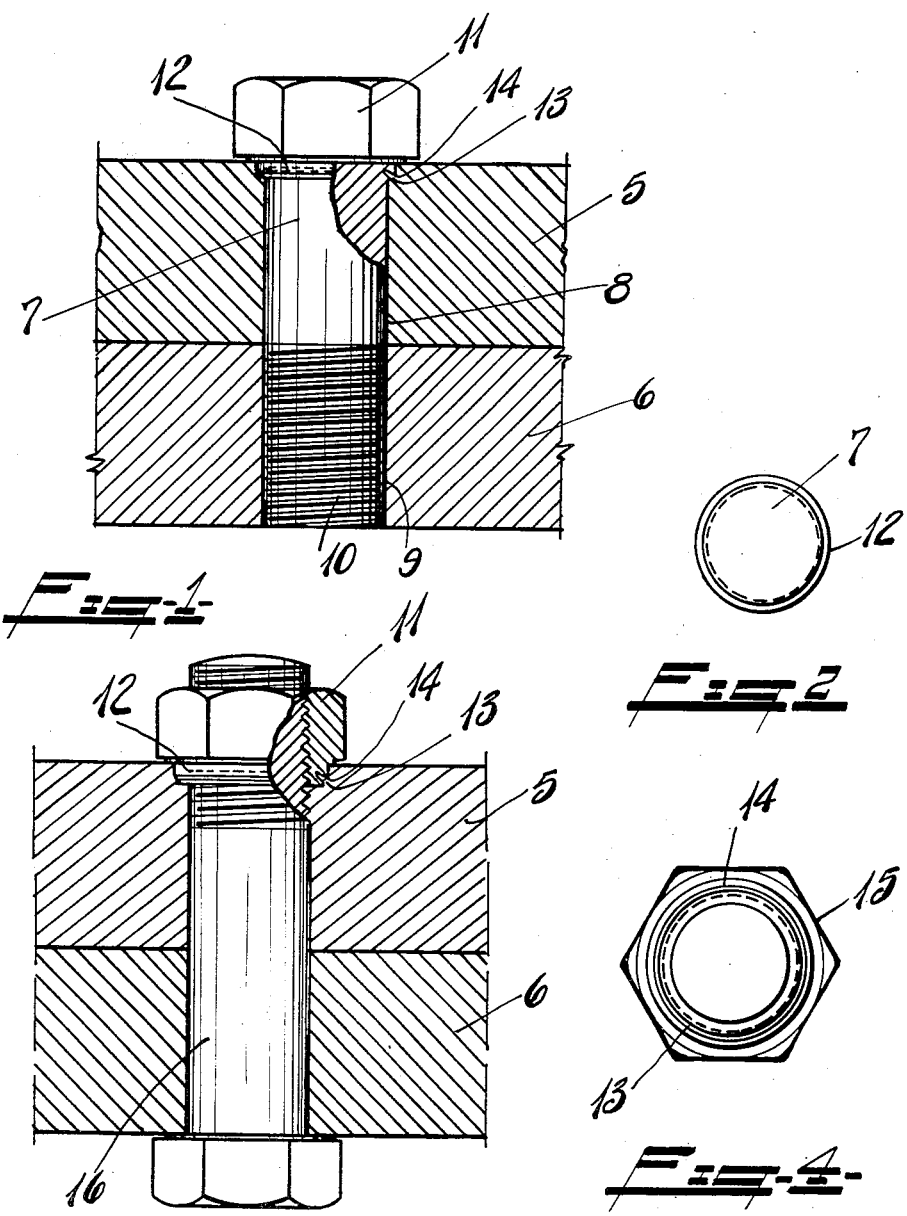

1,976,077

UNITED STATES PATENT OFFICE 1,976,077

SELF-LOCKING NUT AND CAP SCREW

Fritz L. Lindberg and James M. Simons,
Flint, Mich.

Application May 9, 1932, Serial No. 610,189

5 Claims. (Cl. 151—32)

One of the prime objects of the invention is to provide a positive self-locking nut or cap screw, which when once applied, cannot be loosened by the usual jarring or vibration of the member in which it is used.

Another object is to design a self-locking cap screw or nut, which is of simple and practical construction, which can be made up in any of the conventional designs or shapes, and which can be used over and over again.

A further object is to design a positive, self-contained, lock nut or cap screw, the locking feature of which has no relation to the threads, which is adapted to any conventional or special wrench, and which is comparatively economical to manufacture.

The above and other objects will appear as the specification progresses, reference being had to the accompanying drawing in which we have shown the preferred embodiment of our invention, and in which like reference numerals indicate like parts throughout the several views thereof.

In the drawing—

Fig. 1 is a sectional view showing a pair of members rigidly secured together by means of our self-locking cap screw, the screw being shown partly in section.

Fig. 2 is an end view of the screw.

Fig. 3 is a part sectional view similar to Fig. 1, and showing a nut embodying our invention.

Fig. 4 is an end view thereof.

We are aware that there are at present on the market, various kinds of lock washers, nuts, and bolts, which have been designed for locking bolts and nuts in position and preventing their being loosened and lost due to repeated jars and vibrations. In various types of machines, conveyances, and equipment, it is absolutely essential that certain parts be held and retained in proper fixed relation, and should this relationship be destroyed by loss of nuts or bolts, serious damage results, ofttimes with injury and loss of human lives. Up to the present time, the majority of these lock washers, nuts, and bolts have proven impractical, either due to the excessive cost of manufacture, bulk, or failure to accomplish the result intended, and we have, therefore, perfected a very simple, practical, and economical locking feature which can be used on nuts, cap screws, etc., and which cannot become loose because of jars, vibrations, or other causes.

In the drawing in which we have shown the preferred embodiment of our invention, and for the purpose of illustration, we have shown two pieces of material 5 and 6 respectively, and which it is desired to hold in facial contact by means of a cap screw 7; openings 8 are provided in these members in proper alignment, the member 6 being threaded as shown at 9 to accommodate the threaded section 10 of the cap screw as usual.

As hereinbefore mentioned, the head 11 can be of any preferred shape or design, and for the purpose of illustration we have shown the cap screw having a hexagon-shaped head 11, the body section 12, which is directly below the head, being of enlarged diameter, the lower edge terminating in an undercut groove 13, which extends inwardly and at an angle as shown, the upper wall being cut at an angle of substantially sixty (60) degrees, while the lower wall is cut at an angle of approximately forty-five (45) degrees, the external diameter of the screw above the groove being slightly greater than the diameter of the screw proper, so the strength of the screw is not impaired.

When using a cap screw as above described, the screw is threaded into position, the knifelike edge 14 coming into contact with the face of the member 5, bites into the metal, forcing the metal around the upper end of the opening inwardly and into the undercut groove 13, and firmly locks the cap screw in position. When sufficient force is exerted, the screw can be removed if desired, the metal being forced outwardly to original position, and the screw can then be readily removed, and we wish to direct particular attention to the fact that the screw can be removed and reinserted any reasonable number of times without destroying the locking feature or qualities thereof.

In Figs. 3 and 4 of the drawing we have shown our idea incorporated in a nut 15, a bolt 16 being provided as shown, said bolt being of conventional design; the nut, however, is formed identically similar to the head of the cap screw, and the locking feature is identical in construction.

It will, of course, be obvious that this construction prevents the backing off of the nut or bolt due to jars, vibrations, or other causes, and further forms a leak-proof connection, which can be used in containers where liquids or other materials of fine consistency are stored.

Various modifications may be made in the specific details as herein described, it being understood that various modifications may be made in the shape and general details, without departing from the spirit of the invention.

From the foregoing description it will be obvious that we have perfected a very simple, practical, and satisfactory locking bolt or nut for use on machinery and equipment in general.

What we claim is:

1. A self-locking cap screw of the class described and including a head, a shouldered section of greater diameter than the body of the cap screw directly below the head, an undercut groove in said section, said groove being disposed at an angle with relation to the head of the screw.

2. A self-locking cap screw of the class described and including a head, a shouldered section of greater diameter than the body of the cap screw directly below the head, said section terminating in an undercut groove of predetermined width and depth.

3. A self-locking cap screw of the class described and including a head, shouldered section directly below the head and terminating in a knife-like lower edge, a groove extending inwardly and upwardly from said edge, said groove being of a size sufficient to accommodate the metal forced inwardly from the material in which the screw is inserted as the screw is turned.

4. A self-locking threaded member adapted to be inserted in an opening, said member being formed with a shouldered section having an undercut, upwardly extending groove provided therein, the upper and outer edge of the wall of the groove terminating in a knife-like edge adapted to cut into a material and force it inwardly and into the groove as the member is screwed to position.

5. A self-locking threaded member adapted to be inserted in an opening and formed with a shouldered section having an undercut upwardly and inwardly extending groove therein, the outer edge of the wall of said groove being thin and sharp for engaging the metal surrounding the opening in which the self-locking member is inserted for gradually cutting and forcing it inwardly and into said groove as the member is turned to position.

FRITZ L. LINDBERG.
JAMES M. SIMONS.